No. 771,660. PATENTED OCT. 4, 1904.
A. OHL & P. MEYER.
SLAT PAINTING OR VARNISHING MACHINE.
APPLICATION FILED NOV. 24, 1903.
NO MODEL. 6 SHEETS—SHEET 1.

Fig. 1

WITNESSES:
W. B. Fraentzel
Geo. D. Richards

INVENTORS:
Adam Ohl
& Peter Meyer.
BY
Fred L. Fraentzel
ATTORNEY

No. 771,660. PATENTED OCT. 4, 1904.
A. OHL & P. MEYER.
SLAT PAINTING OR VARNISHING MACHINE.
APPLICATION FILED NOV. 24, 1903.
NO MODEL. 6 SHEETS—SHEET 3.

No. 771,660. Patented October 4, 1904.

UNITED STATES PATENT OFFICE.

ADAM OHL AND PETER MEYER, OF NEWARK, NEW JERSEY; SAID MEYER ASSIGNOR TO SAID OHL.

SLAT PAINTING OR VARNISHING MACHINE.

SPECIFICATION forming part of Letters Patent No. 771,660, dated October 4, 1904.

Application filed November 24, 1903. Serial No. 182,441. (No model.)

*To all whom it may concern:*

Be it known that we, ADAM OHL and PETER MEYER, citizens of the United States, residing at Newark, in the county of Essex and State of New Jersey, have invented certain new and useful Improvements in Machines for Staining, Shellacking, Varnishing, or Painting Slats and other Articles; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention relates to improvements in machines for the staining, shellacking, varnishing, or the painting of various articles, whether of wood or metal; and the invention has for its primary object to provide a novel construction of machine which is more especially adapted to the purposes of staining, shellacking, varnishing, or painting of slats, such as are ordinarily used upon trunks and other similar articles of manufacture.

Other objects of the present invention are to provide a simple and operative construction of staining, shellacking, varnishing, or painting machine which shall be efficient in its operations and by means of which the trunk-slats which are fed into the machine have the stain, shellac, or other coating material or daub perfectly applied to their faces and their narrow edges when passing from the machine, all of which is accomplished in very little time and without the least waste of material and with a great saving in labor.

Another important object of the present invention is to provide an arrangement of devices and mechanism such as will be hereinafter more particularly specified, in which the staining material, shellac, varnish, paint, or other daub is evenly distributed over three surfaces of the slat or other article to be treated, the operation of the machine being at all times under the perfect control of the operator.

Other objects of the present invention not at this time more particularly specified will be clearly evident from the following detailed description of this invention.

The present invention consists in the novel construction of staining, shellacking, varnishing, or painting machine hereinafter set forth; and, furthermore, this invention consists in the general arrangements and combinations of devices and the details of the construction thereof, all of which will be hereinafter more particularly described in the following specification and then finally pointed out in the clauses of the claim, which are appended to and form an essential part of this specification.

The invention is clearly illustrated in the accompanying drawings, in which—

Figs. 2 and 3 are the two side views of the said machine.

Similar numerals of reference are employed in the said above-described views to indicate corresponding parts.

Figure 2:
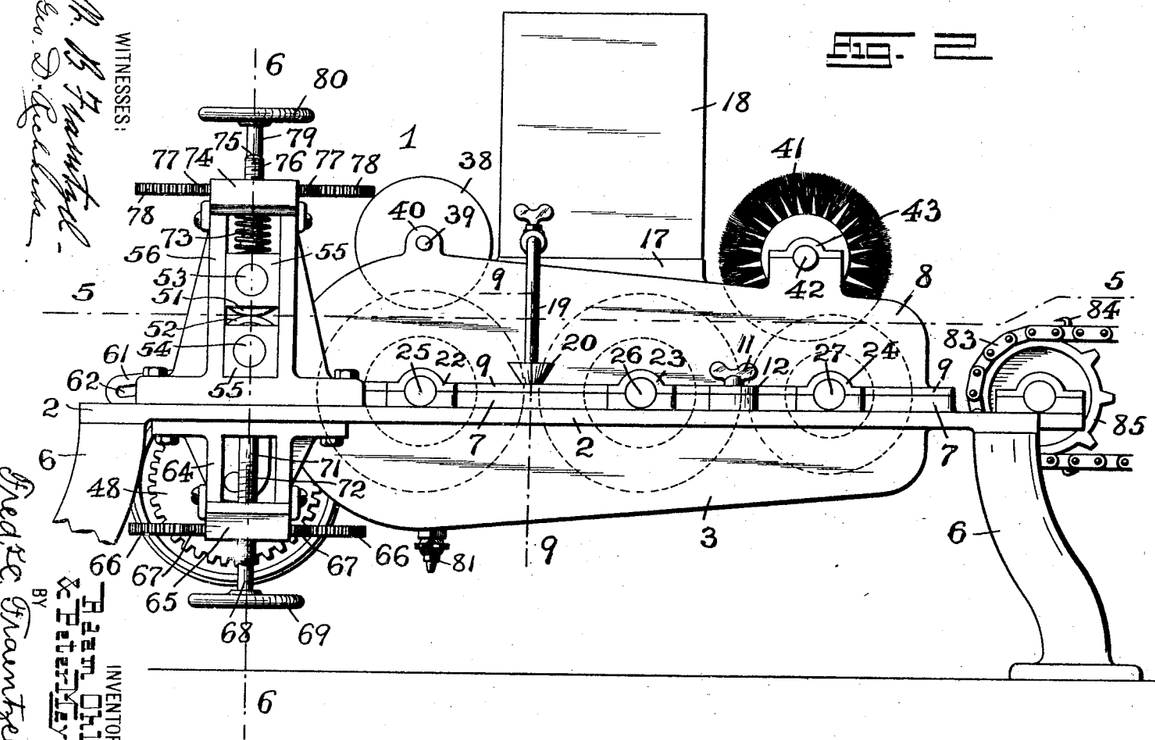
Figure 4:
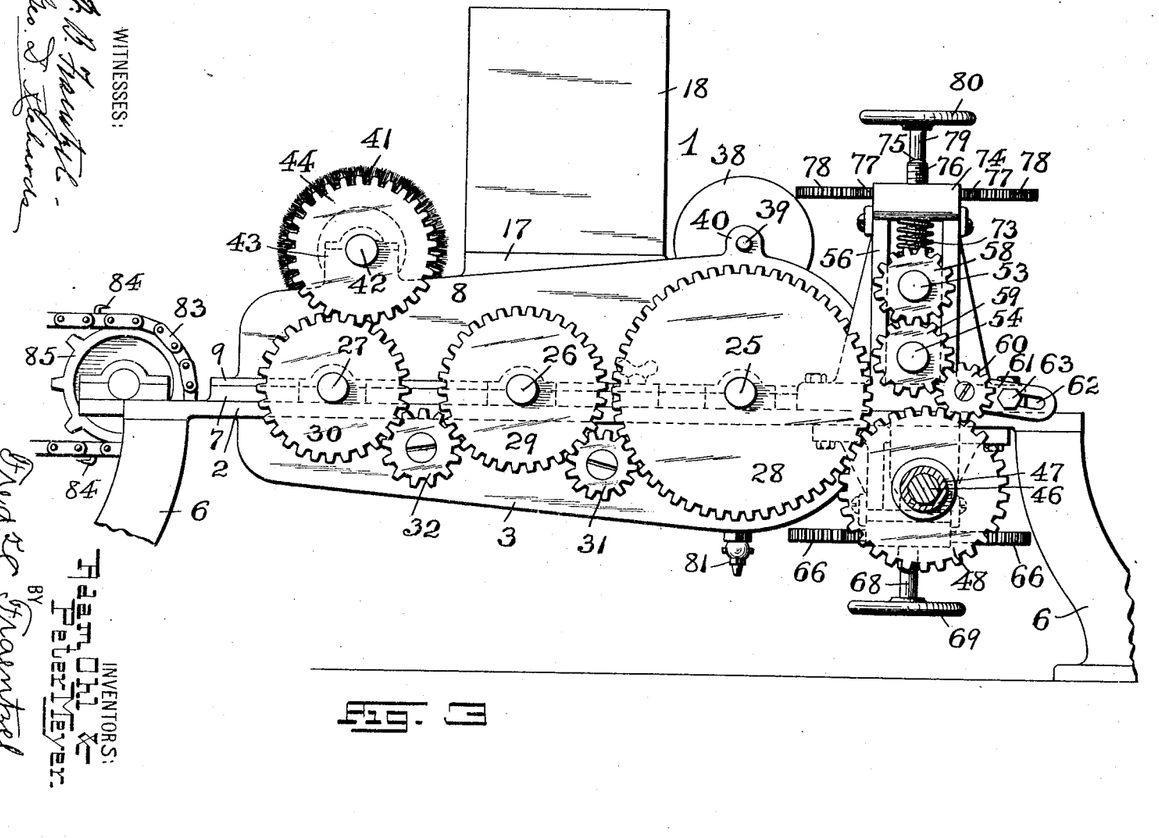
Fig. 4 is a longitudinal vertical section of the machine, illustrating the general arrangement of the feeding devices and the stain, shellac, varnish, or paint applying devices, the said view furthermore representing the passage of a trunk-slat between the said devices during the application of the stain, shellac, varnish, or paint to three of its surfaces.

Referring now to the said drawings, the reference character 1 indicates the complete machine, the same comprising a main frame 2, provided with a suitably-formed trough-shaped body 3, which is preferably made deeper at its one end, 4, than at its other end, 5, as illustrated in Figs. 2, 3, and 4 of the drawings. The said frame 2 may be supported upon suitably-shaped standards or supports 6, and the said trough-shaped body 3 is surrounded by a flange-like portion 7, upon which rests a flange-like portion 9 of a top piece or cover 8, the said top piece or cover 8 being preferably formed with a downwardly-extending edge 10, extending into the open part of the trough-shaped body 3, where said open part is bounded by the said flange-like portion 7, as clearly illustrated in said Fig. 4 of the drawings.

Figure 1:
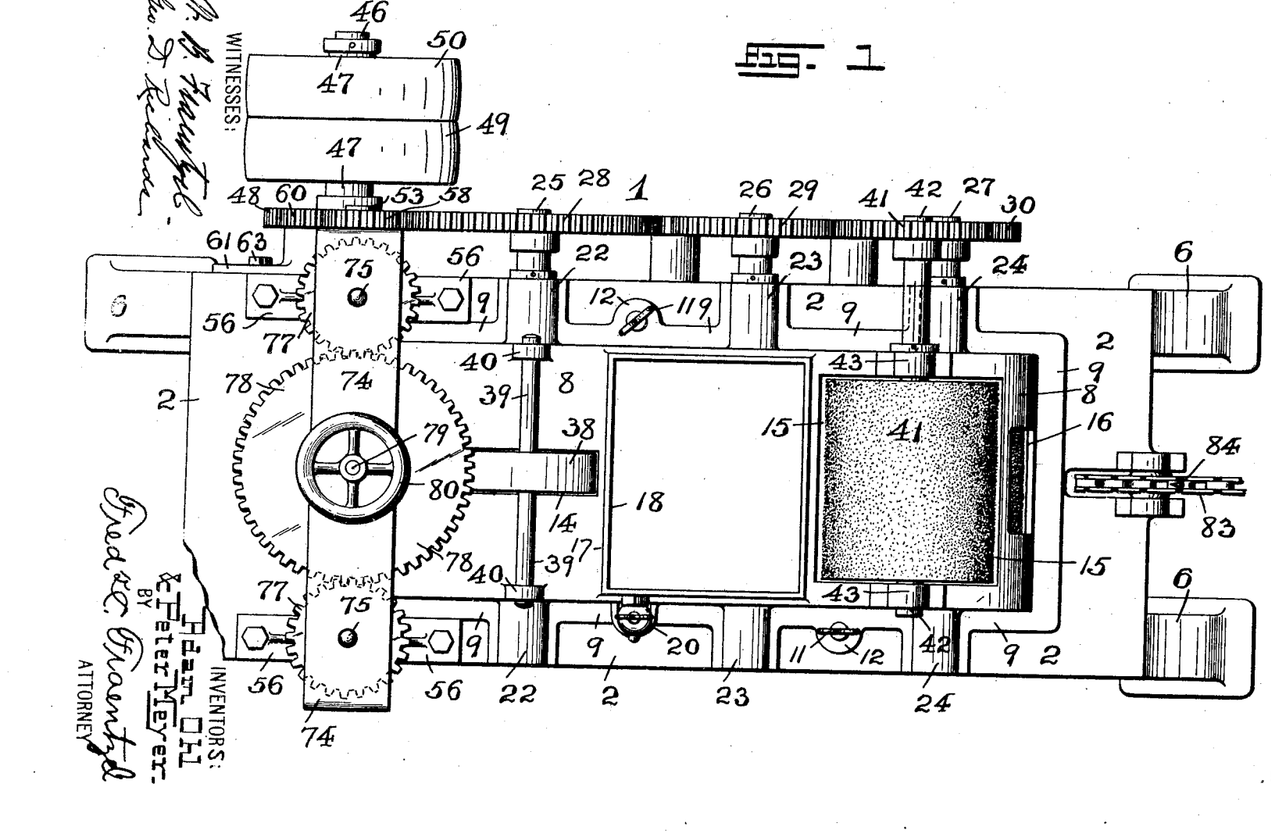
Figure 1 is a plan view of one form of machine comprising an embodiment of the present invention.

The said top piece or cover 8 is suitably secured upon the said main frame 2 by means of any suitable fastening devices, but preferably by means of thumb-screws 11, which are passed through suitably-disposed ears or lugs 12, connected with the top piece or cover 8, and which are screwed into the bed or frame of the machine in the manner represented in Figs. 1, 2, and 3 of the drawings. The said top piece or cover 8 is also provided with suitably-disposed openings 13, 14, 15, and 16, substantially as illustrated and for the purposes hereinafter more fully set forth, and said cover 8 may also be provided with a rest or squared surface 17, on which may be placed a tank or reservoir 18, containing the liquid material or stain which is to be fed into the interior of the trough-shaped body 3 through a feed-pipe 19, connected with said tank or reservoir 18 and terminating above a funnel-shaped device 20 and an inlet or opening 21 in the side of the cover 8 or other suitable part of the apparatus, as illustrated more particularly in Figs. 1, 2, and 9. It will be understood, however, that the said tank 18 and its feed-pipe 19 may be dispensed with, if desired, and that the liquid may be fed through the opening 21 from any other source of supply suitably located outside of the machine, or the liquid may be otherwise fed from time to time into the said trough-shaped body or reservoir 3, as will be clearly understood.

Figure 5:
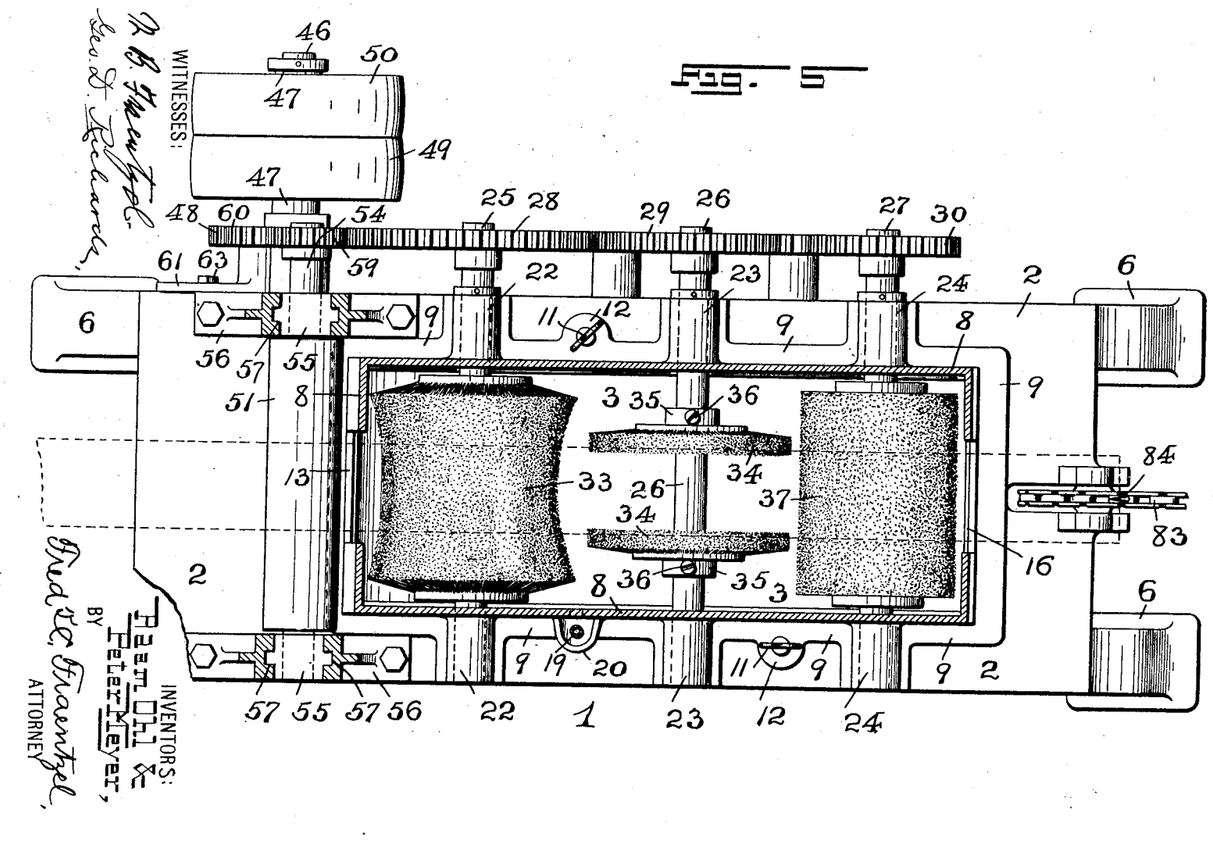
Fig. 5 is a horizontal section taken on line 5 5 in said Fig. 2 of the drawings.

From an inspection of Figs. 1, 2, and 5 it will be seen that the portion 7 of the trough-shaped body 3 and the portion 9 of the top piece or cover 8 are made with parts which form bearings 22, 23, and 24, a shaft or spindle 25 being rotatively arranged in the bearings 22, a shaft or spindle 26 being rotatively arranged in the bearings 23, and a shaft or spindle 27 being rotatively arranged in the bearings 24. The said shaft or spindle 25 is provided with a gear-wheel 28, the shaft or spindle 26 has a gear-wheel 29, and upon the shaft or spindle 27 is a gear-wheel 30, an idler 31 being in mesh with the gears 28 and 29 and an idler 32 being in mesh with the gears 29 and 30, whereby all of said gears 28, 29, and 30 when the machine is set in operation will rotate in the same directions. The said shafts or spindles are all preferably in horizontal alinement and extend laterally across the chamber formed by the said trough-shaped body 3 and the top piece or cover 8. Within the said chamber and suitably arranged upon the shaft or spindle 25 is a rotary brush 33 for the application of the staining liquid, shellac, varnish, paint, or daub upon the face of the slat or other article which is fed through the said chamber, the bristles of the said rotary brush being arranged, preferably, as illustrated in Figs. 4, 5, and 7 to produce a concaved arrangement of the ends of the bristles, so as to more readily conform to the curved face of a trunk-slat; but this is not an absolute necessity, and the arrangement of the bristles may therefore be departed from.

Figures 7, 8, 9:
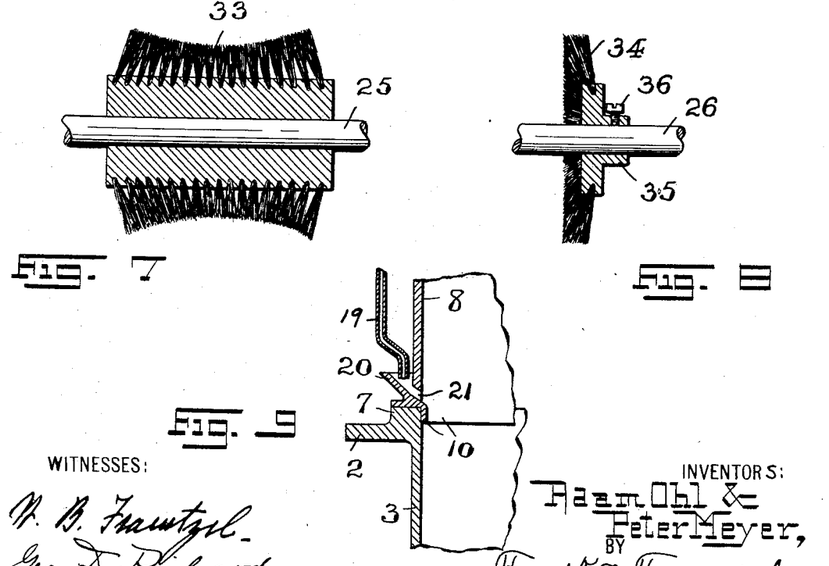
Fig. 7 is a sectional representation of the main stain, shellac, varnish, or paint supplying brush for brushing the wide and usually curved surface of the slat.
Fig. 8 is a sectional representation of one of a pair of rotary brushes for the application of the stain, shellac, varnish, or paint upon the opposite and narrow edges of the slat.
Fig. 9 is a detail vertical section taken on line 9 9 in said Fig. 2.

Upon the said shaft or spindle 26 are a pair of narrow rotary brushes 34, the same being arranged upon the said shaft or spindle in such a manner that a space for the passage of the slat between the said brushes 34 will be provided, as clearly indicated in Fig. 5 of the drawings, the bristles of these brushes 34, as will be seen from Fig. 8, extending angularly from the side of the hub of the brush, as shown, and when the two brushes 34 are arranged upon said shaft 26 then will the said bristles project toward each other, so as to brush against the narrow edges of the slat as it passes between the said brushes to thereby thoroughly apply the stain, shellac, varnish, paint, or the like along the two edges of the slat, as will be clearly evident. That the said brushes 34 may be accommodated to the edges of slats of different widths the said brushes 34 may have their hubs 35 slidably arranged upon the said shaft or spindle 26 to be secured in their adjusted positions by means of set or other screws 36, or any other suitable adjusting means may be employed for the purposes of adjusting the said brushes upon their shaft 26. Upon the shaft 27 there may be arranged a rotary brush 37, termed a "wiper." The purpose of this brush is to cause a smooth and even distribution of the stain, shellac, varnish, or paint upon the slat or other article after the application thereto of such material by means of the brushes 33 and 34. That the slat in passing over the bristles of the brush 33 may be properly retained in contact with the bristles of the said brush a guide and bearing roll 38, of any suitable material, may be arranged above the said brush 33, said roll being arranged upon a shaft or spindle 39, having its ends journaled in bearings 40 or other other suitable devices on the said top piece or cover 8, and the said roll 38 extending into and rotating in the opening 14 in said top piece or cover 8, substantially as shown.

To clean the bottom of the slat from any material that may have become lodged thereon, a rotary brush or wiper 41 may be placed above the brush or wiper 38, the said brush 41 being arranged upon a shaft 42, which is rotatably journaled in bearings 43, connected with said top piece or cover 8, and the said brush 41 extending into and rotating in the opening 15 in said cover 8, the said shaft 42 having secured thereon a gear 44, which is driven from the gear 30 upon the shaft 27, as will be clearly evident from an inspection of Fig. 3 of the drawings.

Figure 6:
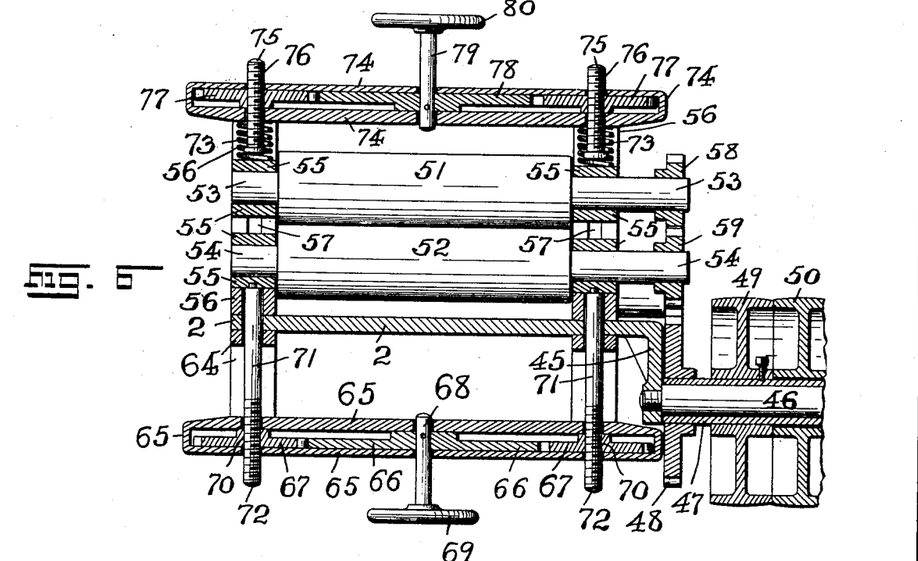
Fig. 6 is a transverse vertical section taken on line 6 6 in said Fig. 2 of the drawings.

In order that the various brushes may be set in motion by means of their respective shafts and gears, the main frame 2, as will be seen from an inspection of Fig. 6 of the drawings, is provided with a downwardly-extending member or bracket 45, to which is secured in any suitable manner a stud 46. Upon this stud is rotatably arranged a sleeve 47, provided with a pinion 48, which is geared with the gear 28, the said sleeve 47 being also provided with a fast pulley 49 and a loose pulley 50 or other suitable means for actuating the said sleeve, thus forming a driving-shaft and by means of which the pinion 48 and the various gears of the mechanism represented in said Fig. 3 of the drawings are set in motion.

That the slat or other article which is to be stained, shellacked, varnished, or painted may be properly fed into the receiving-opening 13 of the said top piece or cover 8 a pair of feed-rolls 51 and 52 are arranged in front of the said inlet-opening, substantially as illustrated. These rolls 51 and 52 are respectively arranged upon shafts or spindles 53 and 54, journaled in boxes or bearings 55, which are slidably arranged in the guiding portions 57 of a pair of brackets or standards 56, suitably arranged upon the upper surface of the frame 2. Thus it will be seen that the two feed-rolls 51 and 52 are separably arranged to receive slats of varying thicknesses between them, the said rolls automatically adjusting themselves to any unevenness in the opposite sides of the slats. To produce the rotary and feeding movements of said rolls 51 and 52, the shaft 53 is provided with a gear 58, which meshes with a gear 59 upon the shaft 54, a third gear 60 being employed between the gears 59 and 48 for conveying the motion of the gear 48 to said gears 59 and 58. The said gear 60 may be adjustably arranged between the two gears 48 and 59 by being rotatively connected with a slide or arm 61, having a slot or elongated opening 62, slidably arranged over a tightening screw or stud 63, substantially as illustrated in Fig. 3 of the drawings. From an inspection of the several figures of the drawings it will also be seen that the two guide-rolls 51 and 52 are adjustable vertically, so as to more readily adapt themselves for the reception of trunk-slats and other articles of varying thicknesses.

The means for adjusting the lower roll 52 comprises a pair of downwardly-extending brackets 64, suitably connected with the lower side of the frame 2, and connected with said brackets 64 is a chambered or other suitable frame or member 65, provided with a main gear 66 and a pair of gears 67 in mesh with said gear 66 in the manner illustrated. The gear 66 is actuated from a stem 68 and hand-wheel 69, and each gear 67 is made with a screw-threaded hub 70, arranged upon the screw portion 72 of the rods 71. Each rod 71 has its upper end portion extending through suitable openings in the brackets 64 and 56 and in the frame 2, the end portion of each rod 71 being rotatively in supportable engagement with a box or bearing 55, in which the shaft 54 is supported. It will thus be seen that by the proper movement of the hand-wheel 69 the lower roll 52 can be adjusted vertically and a corresponding adjustment of the gear 60 can then be made, if this is found necessary.

The upper roll 51 is capable of a separable vertical movement from the roll 52 when the slat is passed between the rolls, the vibratory action of the said upper roll 51 being taken up by an arrangement of coiled springs 73, which are placed between the boxes or bearings 55, in which the shaft 53 rotates, and the lower surface of a chambered member or frame 74, which is suitably connected with the upper portions of the said standards or brackets 56. To limit any undue vibratory motion of the said upper roll 51 when the machine is operated, a pair of adjustable stems or rods 75 are employed, as shown in Fig. 6, these stems or rods 75 having screw portions 76, on which are arranged the screw-threaded hubs of gears 77, said gears 77 receiving their motion from a main gear 78, which is actuated from a stem 79 and hand-wheel 80, as will be clearly evident from an inspection of said Fig. 6. Thus it will be seen that by the proper movement of the hand-wheel 80 the lower end portions of the stems or rods 75 can be brought closer to or farther away from the boxes 55, whereby the vibratory and vertical movement of the roll 51 can be adjusted at will and according to the thicknesses of the slats or other articles which are to be treated.

That the trough-shaped body 3 may be emptied of its liquid contents when found desirable to do so a suitable outlet valve or cock 81 or other similar device may be employed.

The operation of staining, shellacking, varnishing, painting, or the applying of a daub upon trunk and other slats or upon other articles will be clearly understood from the foregoing description and from an inspection of the drawings, the slats being passed in consecutive order from between the rolls 51 and 52 into the receiving-opening 13 in the cover 8 and passing finally in their stained, shellacked, varnished, or painted condition from the opening 16 in the cover 8 upon a suitable carrier 82. This carrier preferably comprises a link chain 83, having suitably disposed and pointed hooks 84, with which the end of the slat can be forced in engagement, so as to pull or draw the slat from the chamber formed by the said trough-shaped body 3 and the cover 8 and the said sprocket or link chain passing over suitably-disposed sprocket-wheels 85, as clearly illustrated in Figs. 1, 2, 3, 4, and 5, for carrying the stained, shellacked, varnished, or painted slat or other article out of the way.

Of course we are aware that changes may be made in the various arrangements and combinations of the devices and their parts, as well as in the details of the construction thereof, without departing from the scope of this invention. Hence we do not limit our invention to the exact arrangements and combinations of the devices and parts as described in the foregoing specification and as illustrated in the accompanying drawings, nor do we confine ourselves to the exact details of the construction of the said parts.

Having thus described our invention, what we claim is—

1. In a machine of the character herein specified, the combination, with the frame of the machine provided with a trough-shaped body forming a part of said frame, of a rotary brush extending across the said trough-shaped body, and a cover arranged above said trough-shaped body, said cover having in one side an inlet through which the article which is to be treated is passed over the brush, said cover being provided in the opposite side with an outlet from which the treated article is passed, a sprocket-wheel journaled in a bearing on the machine-frame, and a link chain passing over said sprocket-wheel, said chain being in alinement with the inlet and outlet of said cover, substantially as and for the purposes set forth.

2. In a machine of the character herein specified, the combination, with the frame of the machine provided with a trough-shaped body forming a part of said frame, of a rotary brush extending across the said trough-shaped body, and a cover arranged above said trough-shaped body, said cover having in one side an inlet through which the article which is to be treated is passed over the brush, said cover being provided in the opposite side with an outlet from which the treated article is passed, a sprocket-wheel journaled in a bearing on the machine-frame, a link chain passing over said sprocket-wheel, said chain being in alinement with the inlet and outlet of said cover, and suitably disposed and pointed hooks connected with said chain against which the end of an article coming from said outlet is brought to be carried away, substantially as and for the purposes set forth.

3. In a machine of the character specified, the combination, with the frame of the machine provided with a paint-receiving trough, and a series of shafts extending laterally across the said trough and arranged one back of the other, of a wide brush upon the one shaft, and a pair of narrow brushes upon the other shaft, the said narrow brushes being arranged back of the said wide brush, that the said several brushes will successively, and not simultaneously, apply the paint to different parts of the article, substantially as and for the purposes set forth.

4. In a machine of the character herein specified, the combination, with the frame of the machine provided with a trough-shaped body forming a part of said frame, of a rotary brush extending across the said trough-shaped body, said brush having bristles arranged to form a concaved surface, and a cover arranged above said trough-shaped body, said cover having an inlet through which the article which is to be treated is passed over the brush, and the said cover being provided with an outlet from which the treated article is passed, substantially as and for the purposes set forth.

5. In a machine of the character specified, the combination, with the frame of the machine provided with a paint-receiving trough, and a series of shafts extending laterally across the said trough and arranged one back of the other, of a wide brush upon the one shaft, and a pair of narrow brushes upon the other shaft, the said narrow brushes being arranged back of the said wide brush, that the several brushes will successively, and not simultaneously, apply the paint to different parts of the article, and a means of lateral adjustment for the said narrow brushes upon their shaft, substantially as and for the purposes set forth.

6. In a machine of the character specified, the combination, with the frame of the machine provided with a trough-shaped body, of a series of three shafts extending laterally across the said body and being in horizontal alinement, a wide brush upon the one shaft near the one end of the trough, a wiper-brush upon the shaft near the other end of the trough, and a pair of narrow brushes upon the intermediately-placed shaft, substantially as and for the purposes set forth.

7. In a machine of the character herein specified, the combination, with the frame of the machine provided with a trough-shaped body, of a series of shafts extending across said trough-shaped body, a wide brush on one of said shafts, and a pair of narrow brushes adjustably arranged upon another of said shafts, said narrow brushes being arranged to provide a space between them, and having angularly-arranged bristles extending toward the space between the said narrow brushes, and a cover arranged above said trough-shaped body, said cover having an inlet through which the article which is to be treated is passed over the brush, and the said cover being provided with an outlet from which the treated article is passed, substantially as and for the purposes set forth.

8. In a machine of the character herein specified, the combination, with the frame of the machine provided with a trough-shaped body, of a series of shafts extending across said trough-shaped body, a wide brush on one of said shafts, said brush having bristles arranged to form a concaved surface, and a pair of narrow brushes adjustably arranged upon another of said shafts, said narrow brushes being arranged to provide a space between them, and having angularly-arranged bristles extending toward the space between the said narrow brushes, and a cover arranged above said trough-shaped body, said cover having an inlet through which the article which is to be treated is passed over the brush, and the said cover being provided with an outlet from which the treated article is passed, substantially as and for the purposes set forth.

9. In a machine of the character herein specified, the combination, with the frame of the machine provided with a trough-shaped body, and a cover arranged over said trough-shaped body, of a series of shafts 25, 26 and 27, a brush 33 on said shaft 25, a pair of narrow brushes on said shaft 26, a "wiper-brush" on said shaft 27, and means for actuating said shafts and their brushes, substantially as and for the purposes set forth.

10. In a machine of the character herein specified, the combination, with the frame of the machine provided with a trough-shaped body, and a cover arranged over said trough-shaped body, of a series of shafts 25, 26 and 27, a brush 33 on said shaft 25, a pair of narrow brushes on said shaft 26, a "wiper-brush" on said shaft 27, and means for actuating said shafts and their brushes, consisting, essentially, of a gear 28 on said shaft 25, a gear 29 on said shaft 26, a gear 30 on said shaft 27, intermediate gears between each set of gears 28 and 29, and 29 and 30, a main driving-shaft, and a gear 48 on said shaft in mesh with said gear 28, substantially as and for the purposes set forth.

11. In a machine of the character herein specified, the combination, with the frame of the machine provided with a trough-shaped body, and a cover arranged over said trough-shaped body, of a series of shafts 25, 26 and 27, a brush 33 on said shaft 25, a pair of narrow brushes on said shaft 26, a "wiper-brush" on said shaft 27, a shaft 42 connected with said cover, a brush 41 on said shaft 42, a guide or bearing roll rotatively arranged above said brush 33, and means for actuating said shafts and their brushes, substantially as and for the purposes set forth.

12. In a machine of the character herein specified, the combination, with the frame of the machine provided with a trough-shaped body, and a cover arranged over said trough-shaped body, of a series of shafts 25, 26 and 27, a brush 33 on said shaft 25, a pair of narrow brushes on said shaft 26, a "wiper-brush" on said shaft 27, a shaft 42 connected with said cover, a brush 41 on said shaft 42, a guide or bearing roll rotatively arranged above said brush 33, and means for actuating said shafts and their brushes, consisting, essentially, of a gear 28 on said shaft 25, a gear 29 on said shaft 26, a gear 30 on said shaft 27, intermediate gears between each set of gears 28 and 29, and 29 and 30, a main driving-shaft, a gear 48 on said shaft in mesh with said gear 28, and a gear 44 on said shaft 42 in mesh with said gear 30, substantially as and for the purposes set forth.

13. In a machine of the character herein specified, the combination, with the frame of the machine provided with a trough-shaped body, of means in said body for applying a liquid to the article to be treated, and means on said frame for guiding the article to said trough-shaped body, comprising, a pair of standards having guides, boxes slidably arranged in said guides, a pair of guide-rolls 51 and 52 rotatively supported in said boxes, and a means of adjustment connected with each roll, consisting, of a pair of downwardly-extending brackets, a frame 65 connected with said brackets, a gear 66, and a pair of gears 67 in said frame, said gears 67 having screw-threaded hubs, and screw-threaded rods 71 in said screw-threaded hubs and in supporting engagement with the boxes of said roll 52, a frame 74 connected with the standards on the frame of the machine, springs connected with said standards and in contact with the boxes of said roll 51 and said frame 74, a gear 78 and a set of gears 77 in said frame, said gears 78 having screw-threaded hubs, and a screw-threaded rod for each gear 77, and means connected with said gear 66 and said gear 78 for actuating said gears, substantially as and for the purposes set forth.

14. In a machine of the character herein specified, the combination, with the frame of the machine provided with a trough-shaped body, of means in said body for applying a liquid to the article to be treated, a pair of guide-rolls for guiding the article to said trough-shaped body, and means for actuating said guide-rolls, consisting, of a set of gears 58 and 59, a driving-gear 48, and an adjustable intermediate gear 60 in mesh with said gears 59 and 48, substantially as and for the purposes set forth.

15. In a machine of the character specified, in combination, with a series of shafts, a wide brush on one of said shafts, said brush having bristles arranged to form a concaved surface, and a pair of narrow brushes on another of said shafts, said narrow brushes being arranged to provide a space between them and having angularly-arranged bristles extending toward the space between the said brushes, and means for supplying a liquid to the said brushes, substantially as and for the purposes set forth.

In testimony that we claim the invention set forth above we have hereunto set our hands this 20th day of November, 1903.

ADAM OHL.
PETER MEYER.

Witnesses:
FREDK. C. FRAENTZEL,
GEO. D. RICHARDS.